(12) United States Patent
Noda et al.

(10) Patent No.: US 9,151,602 B2
(45) Date of Patent: Oct. 6, 2015

(54) CORRECTED BALL DIAMETER CALCULATING METHOD AND FORM MEASURING INSTRUMENT

(75) Inventors: Takashi Noda, Utsunomiya (JP); Hiromi Deguchi, Utsonomiya (JP)

(73) Assignee: MITUTOYO CORPORATION, Kawasaki (JP)

( * ) Notice: Subject to any disclaimer, the term of this patent is extended or adjusted under 35 U.S.C. 154(b) by 1153 days.

(21) Appl. No.: 12/730,534

(22) Filed: Mar. 24, 2010

(65) Prior Publication Data

US 2010/0250178 A1 Sep. 30, 2010

(30) Foreign Application Priority Data

Mar. 25, 2009 (JP) ................. 2009-073572

(51) Int. Cl.
*G01B 21/04* (2006.01)
*G01B 5/008* (2006.01)
*G01B 5/20* (2006.01)
*G01B 5/28* (2006.01)

(52) U.S. Cl.
CPC .............. *G01B 21/042* (2013.01); *G01B 5/008* (2013.01); *G01B 5/20* (2013.01); *G01B 5/201* (2013.01); *G01B 5/28* (2013.01); *G01B 21/045* (2013.01)

(58) Field of Classification Search
CPC ............ G01B 5/008; G01B 5/08; G01B 5/20; G01B 5/201; G01B 5/28; G01B 21/042; G01B 21/045
USPC ..................................... 702/157, 167, 168, 95
See application file for complete search history.

(56) References Cited

U.S. PATENT DOCUMENTS

| 3,911,586 | A | * | 10/1975 | Malonda | ........................ 33/533 |
| 4,333,238 | A | * | 6/1982 | McMurtry | ....................... 33/504 |
| 4,382,215 | A | * | 5/1983 | Barlow et al. | .............. 318/568.1 |
| 4,958,438 | A | * | 9/1990 | Hemmelgarn | .................. 33/503 |
| 6,062,062 | A | * | 5/2000 | Toida et al. | ..................... 73/1.81 |
| 6,460,261 | B1 | * | 10/2002 | Noda et al. | ..................... 33/503 |
| 2005/0111725 | A1 | * | 5/2005 | Noda et al. | .................... 382/141 |
| 2010/0198553 | A1 | * | 8/2010 | Lee et al. | ...................... 702/157 |
| 2012/0060385 | A1 | * | 3/2012 | Hunter et al. | ................... 33/503 |

FOREIGN PATENT DOCUMENTS

JP 2001-264048 9/2001

* cited by examiner

*Primary Examiner* — Sujoy Kundu
*Assistant Examiner* — Liam R Casey
(74) *Attorney, Agent, or Firm* — Rankin, Hill & Clark LLP

(57) ABSTRACT

A corrected ball diameter calculating method includes: preparing a reference gauge that has at least one reference peripheral surface of an outer peripheral surface and an inner peripheral surface; valuing of diameter values of the reference peripheral surface at a plurality of different height positions from a bottom surface of the reference gauge; calculating calibrated diameter values per each of the height positions; placing the reference gauge on the rotary table and causing the stylus tip to touch a plurality of measurement sites on the reference peripheral surface at each of the height positions to calculate measured diameter values that are diameter values of a circle passing through the neighborhood of center points of the stylus tip; and calculating the corrected ball diameters per each of the height positions from the calibrated diameter values and the measured diameter values that are calculated per each of the height positions.

10 Claims, 14 Drawing Sheets

CORRECTED BALL DIAMETER CALCULATING METHOD AND FORM MEASURING INSTRUMENT

CROSS-REFERENCE TO RELATED APPLICATIONS

This application is based upon and claims the benefit of priority from Japanese Patent Application No. 2009-073572, filed Mar. 25, 2009, the entire contents of which are incorporated herein by reference.

BACKGROUND

1. Field of the Invention

The present invention relates to a corrected ball diameter calculating method and a form measuring instrument.

2. Description of the Related Art

Conventionally, as form measuring instruments that measure the dimensions and the profile of an workpiece, there have been known coordinate measuring machines, for example.

FIG. 10 is a diagram showing a conventional coordinate measuring machine 1.

The coordinate measuring machine 1 is equipped with a measuring machine body 2 and a personal computer (PC) 3 that processes measurement data acquired by the measuring machine body 2 to determine the dimensions and the profile of an workpiece W.

The measuring machine body 2 is equipped with a table 21, a gantry-type frame 22 that is disposed so as to be movable in an anteroposterior direction (the direction of the Y axis) on the table 21, a slider 23 that is disposed so as to be movable in a transverse direction (the direction of the X axis) along a horizontal beam 221 of the gantry-type frame 22, an ascending and descending shaft 24 that is disposed such that it may ascend and descend in the vertical direction (the direction of the Z axis) in the slider 23, and a probe 25 that is attached to the lower end of the ascending and descending shaft 24. A moving mechanism 26 that supports the probe 25 such that the probe 25 is movable in the triaxial direction is configured from the gantry-type frame 22, the slider 23 and the ascending and descending shaft 24. The probe 25 is equipped with a stylus 28 on whose distal a stylus tip 27 is disposed.

As methods by which the coordinate measuring machine 1 measures the workpiece W, point measurement and scanning measurement are commonly known.

In point measurement, the coordinate measuring machine 1 first causes the stylus tip 27 to sequentially touch measurement sites on the workpiece W while causing the probe 25 to move in the triaxial direction, whereby the coordinate measuring machine 1 acquires the coordinate values of the probe 25 in each touch point. Here, as shown in FIG. 11, the points of contact between the stylus tip 27 and the workpiece W exist in positions offset by an amount equal to the radius r of the stylus tip 27 from the center point P of the stylus tip 27 determined from the coordinate values of the probe 25. Consequently, the coordinate measuring machine 1 can determine the points of contact between the stylus tip 27 and the workpiece W from the coordinate values of the probe 25, so the coordinate measuring machine 1 can determine the dimensions and the profile of the workpiece W by using each of the coordinate values it has acquired to perform a predetermined operation.

In scanning measurement, the coordinate measuring machine 1 causes the probe 25 to move along the profile of the workpiece W in a state where the stylus tip 27 has been caused to touch the workpiece W and acquires the coordinate values of the probe 25 at a predetermined sampling pitch. Consequently, the coordinate measuring machine 1 can determine the dimensions and the profile of the workpiece W by using these coordinate values to perform a predetermined operation.

Incidentally, in measurement using the coordinate measuring machine 1, it is necessary to replace the stylus 28 depending on the measurement target, and the coordinate measuring machine 1 cannot automatically recognize the length of the stylus 28 and the diameter value of the stylus tip 27 disposed on the distal end of the stylus 28 when the stylus 28 has been attached. The length of the stylus 28 and the diameter value of the stylus tip 27 are values needed for determining the center point P of the stylus tip 27 from the coordinate values of the probe 25 and are values needed when determining the points of contact between the stylus tip 27 and the workpiece W from that center point P. For that reason, when the coordinate measuring machine 1 is used to measure an workpiece, it is necessary to perform, in advance, calibration that causes the coordinate measuring machine 1 to perform measurement of a master ball to cause the coordinate measuring machine 1 recognize the length of the stylus 28 and the diameter value of the stylus tip 27.

FIG. 12 is a diagram showing calibration.

In calibration, a diameter-calibrated value D of a master ball M is inputted to the coordinate measuring machine 1, and then the coordinate measuring machine 1 is caused to measure the master ball M, whereby the coordinate measuring machine 1 is caused to determine and recognize the length of the stylus 28 and the diameter value of the stylus tip 27. At this time, calculatory diameter values of the stylus tip 27 that are determined by measuring the master ball M ordinarily differ from diameter-calibrated values of the stylus tip 27 due to error that arises because of the affects of flexure of the stylus or the like when measuring the master ball M. Hereinafter, these calculatory diameter values of the stylus tip 27 will be called corrected ball diameters.

Incidentally, the magnitude of error that arises when measuring the master ball M differs depending on whether measurement of the master ball M is performed by static point measurement or dynamic scanning measurement. Consequently, corrected ball diameters that are determined by calibration differ depending on whether measurement of the master ball M has been performed by point measurement or scanning measurement. For that reason, when point measurement is performed by the coordinate measuring machine 1, it is necessary to use corrected ball diameters for point measurement that have been obtained by performing calibration by point measurement, and when scanning measurement is performed by the coordinate measuring machine 1, it is necessary to use corrected ball diameters for scanning measurement that have been obtained by performing calibration by scanning measurement.

In calibration resulting from point measurement, as shown in FIG. 12, the stylus tip 27 is caused to touch plural measurement sites on the master ball M to determine a measured diameter value Dp that is the diameter value of a circle passing through the neighborhood of the center points of the stylus tip 27 when the stylus tip 27 has touched each measurement site.

FIG. 13 is a diagram showing center points P1 of the stylus tip 27 that are recognized during point measurement.

At the time of this measurement, the center points of the stylus tip 27 end up being recognized as being in the positions of points P1 offset (e.g., slightly inward) by an amount equal to error G from the original positions P because of the affects of flexure of the stylus 28 or the like. For that reason, the measured diameter value Dp becomes a value including two parts of this error G. Thus, as shown in expression (1) below, by subtracting the diameter-calibrated value D of the master ball M from this measured diameter value Dp, a corrected ball diameter dp (a calculatory diameter value of the stylus tip 27) for point measurement including two parts of this error G can be determined.

$$dp=Dp-D \quad (1)$$

FIG. 14 is a diagram showing calibration performed by scanning measurement.

In calibration resulting from scanning measurement, the circumference of the equator of the master ball M, the XZ in-plane semi-circumference of the northern hemisphere and the YZ in-plane semi-circumference of the northern hemisphere are profile-measured at a predetermined sampling pitch to determine a measured diameter value Ds in the same manner as mentioned before, and, as shown in expression (2) below, by subtracting the diameter-calibrated value D of the master ball M from the measured diameter value Ds, a corrected ball diameter ds for scanning measurement including two parts of the error G can be determined.

$$d=Ds-D \quad (2)$$

Additionally, by dividing each of the corrected ball diameters dp and ds that have been determined in this manner by 2, the radius r1 (FIG. 13) of the stylus tip 27 including error G can be calculated depending on the measurement method. The center points of the stylus tip 27 are recognized by the coordinate measuring machine 1 as being in positions P1 including error G that arises depending on the measurement measure, so the coordinate measuring machine 1 can, by determining the positions offset by an amount equal to the radius r1 of the stylus tip 27 calculated depending on the measurement method (point measurement, scanning measurement) from the center points P1 of the stylus tip 27 that it recognizes, determine the points of contact between the stylus tip 27 and the workpiece W while controlling error G that arises depending on the measurement method and can analyze the profile and the like of the workpiece with high precision. In this manner, the coordinate measuring machine 1 can analyze the profile and the like of an workpiece with high precision by calculating beforehand the corrected ball diameters dp and ds including error G at the time of measurement and using these corrected ball diameters dp and ds to analyze the profile and the like of the workpiece.

Incidentally, in recent years there has been proposed a coordinate measuring machine that uses a rotary table to perform measurement while causing an workpiece to rotate (e.g., JP-A-2001-264048). The coordinate measuring machine described in JP-A-2001-264048 can efficiently measure an workpiece with a complex profile and can shorten the amount of analysis time of the profile and the like of the workpiece because the coordinate measuring machine can measure the workpiece with a total of four axes including three axes of a moving mechanism and one axis of the rotary table.

However, it has been found that when a rotary table is used in this manner to measure an workpiece and the corrected ball diameters are used to analyze the profile and the like of the workpiece, error ends up arising in the analysis result even though the error is slight. Moreover, it has been found that this error is affected by the height position of the workpiece that is measured. It is thought that when an workpiece is measured while the workpiece is caused to rotate, error resulting from measuring the workpiece while causing the workpiece to rotate and error corresponding to the height position that is measured arises because of runout of the rotary table, whirl of the workpiece and flexure of the stylus or the like, and error ends up arising in the analysis result because of these measurement errors.

That is, it is thought that because error that arises by measuring an workpiece while causing the workpiece to rotate and error that arises depending on the height position that is measured are not included in the conventional corrected ball diameters that are calculated by measuring the master ball M in a stationary state, when the conventional corrected ball diameters are used to analyze the profile and the like of the workpiece when the workpiece has been measured while the workpiece has been caused to rotate, analysis precision ends up dropping in correspondence to these errors not being included in the corrected ball diameters.

SUMMARY

It is an object of the present invention to provide a corrected ball diameter calculating method and form measuring instrument that can calculate corrected ball diameters that can improve analysis precision when using a rotary table to measure and analyze the profile and the like of an workpiece.

According to a first aspect of the invention, there is provided a corrected ball diameter calculating method of the present invention is a corrected ball diameter calculating method in a form measuring instrument, the form measuring instrument including a rotary table that is disposed so as to be rotatable and on which an workpiece is placed, a rotation angle sensor that detects the rotation angle of the rotary table, a probe that has a stylus tip, and a coordinate value sensor that detects the coordinate values of the probe, the form measuring instrument using detected values of each of the sensors that are detected when the probe has been caused to touch the workpiece and corrected ball diameters and the like that are calculatory diameter values of the stylus tip to analyze the profile and the like of the workpiece, the corrected ball diameter calculating method calculating the corrected ball diameters that are used in the form measuring instrument, the corrected ball diameter calculating method including: a calibrated diameter value calculating step of preparing a reference gauge that has at least one reference peripheral surface of an outer peripheral surface and an inner peripheral surface, performing, with respect to this reference gauge, valuing of diameter values of the reference peripheral surface at a plurality of different height positions from a bottom surface of the reference gauge with respect to this reference gauge, and calculating calibrated diameter values per each of the height positions; a measured diameter value calculating step of placing the reference gauge on the rotary table and causing the stylus tip to touch a plurality of measurement sites on the reference peripheral surface at each of the height positions in a state where the reference gauge has been caused to rotate by driving the rotary table, to thereby calculate, per each of the height positions, measured diameter values that are diameter values of a circle passing through the neighborhood of center points of the stylus tip when the stylus tip has touched each of the measurement sites; and a corrected ball diameter calculating step of calculating the corrected ball diameters per each of the height positions from the calibrated diameter values and the measured diameter values that have been calculated per each of the height positions.

The calibrated diameter value calculating step is performed by a predetermined high-precision form measuring instrument.

According to the present invention, the corrected ball diameters are calculated by measuring the reference gauge while causing the reference gauge to rotate, so the corrected ball diameters including error that arises by measuring the reference gauge (workpiece) while causing the reference gauge (workpiece) to rotate can be calculated.

Further, the corrected ball diameters are calculated per each of the height positions by measuring the plurality of height positions of the reference gauge, so the corrected ball diameters including error that arises depending on the height position that is measured can be calculated per each of the height positions.

Consequently, when the workpiece has been measured while the workpiece has been caused to rotate, the profile and the like of the workpiece can be analyzed with high precision by using the corrected ball diameters including these errors to analyze the profile and the like of the workpiece.

In the corrected ball diameter calculating method of the present invention, it is preferred that in the measured diameter value calculating step, the reference peripheral surface is point-measured and profile-measured to thereby calculate measured diameter values resulting from point measurement and measured diameter values resulting from scanning measurement, and in the corrected ball diameter calculating step, corrected ball diameters resulting from point measurement and corrected ball diameters resulting from scanning measurement are calculated from the calibrated diameter values and from the measured diameter values resulting from point measurement and the measured diameter values resulting from scanning measurement.

When a rotary table is used to measure an workpiece and analyze the profile and the like of that workpiece, the way in which error arises differs depending on whether the workpiece is point-measured or profile-measured.

According to the present invention, the corrected ball diameters are calculated by point-measuring the reference gauge in a state where the reference gauge has been caused to rotate, so corrected ball diameters including error that arises by performing point measurement can be calculated. Similarly, the corrected ball diameters are calculated by profile-measuring the reference gauge, so the calculated ball diameters including error that arises by performing scanning measurement can be calculated.

For that reason, by using the corrected ball diameters corresponding to the method of measuring (point measurement, scanning measurement) the workpiece to analyze the profile and the like of the workpiece, analysis error that arises depending on the measurement method can be suppressed, and the profile and the like of the workpiece can be analyzed with higher precision.

In the corrected ball diameter calculating method of the present invention, it is preferred that in the measured diameter value calculating step, the outer peripheral surface and the inner peripheral surface of the reference gauge are measured to thereby calculate measured diameter values resulting from measurement of the outer peripheral surface and measured diameter values resulting from measurement of the inner peripheral surface, and in the corrected ball diameter calculating step, corrected ball diameters resulting from measurement of the outer peripheral surface and corrected ball diameters resulting from measurement of the inner peripheral surface are calculated from the calibrated diameter values and from the measured diameter values resulting from measurement of the outer peripheral surface and the measured diameter values resulting from measurement of the inner peripheral surface.

When a rotary table is used to measure an workpiece and analyze the profile and the like of that workpiece, the way in which error arises differs depending on whether the outer peripheral surface of the workpiece (e.g., a shaft) is measured or the inner peripheral surface of the workpiece (e.g., a hole) is measured.

According to the present invention, the corrected ball diameters are calculated by measuring the outer peripheral surface of the reference gauge in a state where the reference gauge has been caused to rotate, so the corrected ball diameters including error that arises by measuring the outer peripheral surface can be calculated. Similarly, the corrected ball diameters are calculated by measuring the inner peripheral surface of the reference gauge, so the calculated ball diameters including error that arises by measuring the inner peripheral surface of the workpiece can be calculated.

For that reason, by using the corrected ball diameters corresponding to the measurement target (outer peripheral surface, inner peripheral surface) to analyze the profile and the like of the workpiece, analysis error that arises depending on the measurement target can be suppressed, and the profile and the like of the workpiece can be analyzed with higher precision.

A form measuring instrument of the present invention is a form measuring instrument including: a rotary table that is disposed so as to be rotatable and on which an workpiece is placed; a rotation angle sensor that detects the rotation angle of the rotary table; a probe that has a stylus tip; a moving mechanism that causes the probe to move; a coordinate value sensor that detects the coordinate values of the probe; a controller that controls the rotary table and the moving mechanism to cause the stylus tip to touch the workpiece; and an analyzer that uses detected values that are detected by each of the sensors when the stylus tip has been caused to touch the workpiece by the controller and corrected ball diameters and the like that are calculatory diameter values of the stylus tip to analyze the profile and the like of the workpiece, wherein the analyzer includes a storage unit that stores beforehand calibrated diameter values that have been calculated per each height position by performing, with respect to a reference gauge that has at least one reference peripheral surface of an outer peripheral surface and an inner peripheral surface, valuing of diameter values of the reference peripheral surface of the reference gauge at a plurality of different height positions from a bottom surface of the reference gauge, a measured diameter value calculating unit that calculates, per each of the height positions, measured diameter values that are diameter values of a circle passing through the neighborhood of center points of the stylus tip when the stylus tip has touched each measurement site as a result of the stylus tip being caused to touch a plurality of measurement sites on the reference peripheral surface of the reference gauge at each of the height positions in a state where the reference gauge has been placed on the rotary table and rotated, a corrected ball diameter calculating unit that calculates the corrected ball diameters per each of the height positions from the calibrated diameter values and the measured diameter values that have been calculated per each of the height positions, and an analyzing unit that uses the corrected ball diameters to calculate the profile and the like of the workpiece.

The calibrated diameter value calculating unit and the measured diameter value calculating unit may be configured to drive the rotary table and the moving mechanism via the controller, measure the reference gauge and calculate each diameter value from the detected values that are detected at the time of that measurement or may be configured such that, when the rotary table and the moving mechanism are manually operated by a worker via the controller and the reference gauge is measured, the calibrated diameter value calculating unit and the measured diameter value calculating unit calculate each diameter value from the detected values that are detected at the time of that measurement.

Similarly, the analyzing unit may be configured such that it itself drives the rotary table and the moving mechanism via the controller to thereby measure the workpiece and analyze the profile and the like of the workpiece or may be configured such that, when the rotary table and the moving mechanism are manually operated by a worker via the controller and the workpiece is measured, the analyzing unit analyzes the profile and the like of the workpiece.

According to the present invention, the corrected ball diameters are calculated by measuring the reference gauge while causing the reference gauge to rotate, so corrected ball diameters including error that arises by measuring the reference gauge while causing the reference gauge to rotate can be calculated. Further, the corrected ball diameters are calculated per each of the height positions by measuring the plurality of height positions of the reference gauge, so corrected ball diameters including error that arises depending on the height position that is measured can be calculated per each of the height positions.

Additionally, when the workpiece has been measured while the workpiece has been caused to rotate, the profile and the like of the workpiece can be analyzed with high precision by using the corrected ball diameters including these errors to analyze the profile and the like of the workpiece.

In the form measuring instrument of the present invention, it is preferred that the analyzing unit further includes an analysis-use corrected ball diameter calculating unit that calculates, from the corrected ball diameters that have been calculated per each of the height positions, analysis-use corrected ball diameters that are used when analyzing the workpiece and a workpiece analyzing unit that uses the analysis-use corrected ball diameters to analyze the profile and the like of the workpiece, and the analysis-use corrected ball diameter calculating unit calculates, from the corrected ball diameters that have been calculated per each of the height positions, approximate functions whose variables are height positions that are measured and calculates, from the approximate functions, analysis-use corrected ball diameters corresponding to height positions of the workpiece that the controller measures.

According to the present invention, approximate functions of the height positions are calculated from the corrected ball diameters that have been calculated per each of the height positions, and analysis-use corrected ball diameters corresponding to height positions of the workpiece that are measured are calculated from the approximate functions. In these analysis-use corrected ball diameters, there is included error that arises depending on the height position of the workpiece that the controller measures, so by using the analysis-use corrected ball diameters to analyze the profile and the like of the workpiece, analysis error that arises depending on the height position that is measured can be suppressed, and the profile and the like of the workpiece can be analyzed with higher precision.

In the form measuring instrument of the present invention, it is preferred that the analyzing unit further includes an analysis-use corrected ball diameter calculating unit that calculates, from the corrected ball diameters that have been calculated per each of the height positions, analysis-use corrected ball diameters that are used when analyzing the workpiece and a workpiece analyzing unit that uses the analysis-use corrected ball diameters to analyze the profile and the like of the workpiece, and the analysis-use corrected ball diameter calculating unit calculates, as the analysis-use corrected ball diameters, average values of the corrected ball diameters that have been calculated per each of the height positions.

According to the present invention, average values of the corrected ball diameters that have been calculated per each of the height positions are calculated as the analysis-use corrected ball diameters, so the amount of calculation that the form measuring instrument processes can be reduced in comparison to a configuration that calculates the analysis-use corrected ball diameters from predetermined approximate functions per each of the height positions of the workpiece that are measured.

BRIEF DESCRIPTION OF THE DRAWINGS

The present invention will become more fully understood from the detailed description given hereinbelow and the accompanying drawing which is given by way of illustration only, and thus is not limitative of the present invention and wherein.

DETAILED DESCRIPTION OF THE INVENTION

First Embodiment

Figure 1:
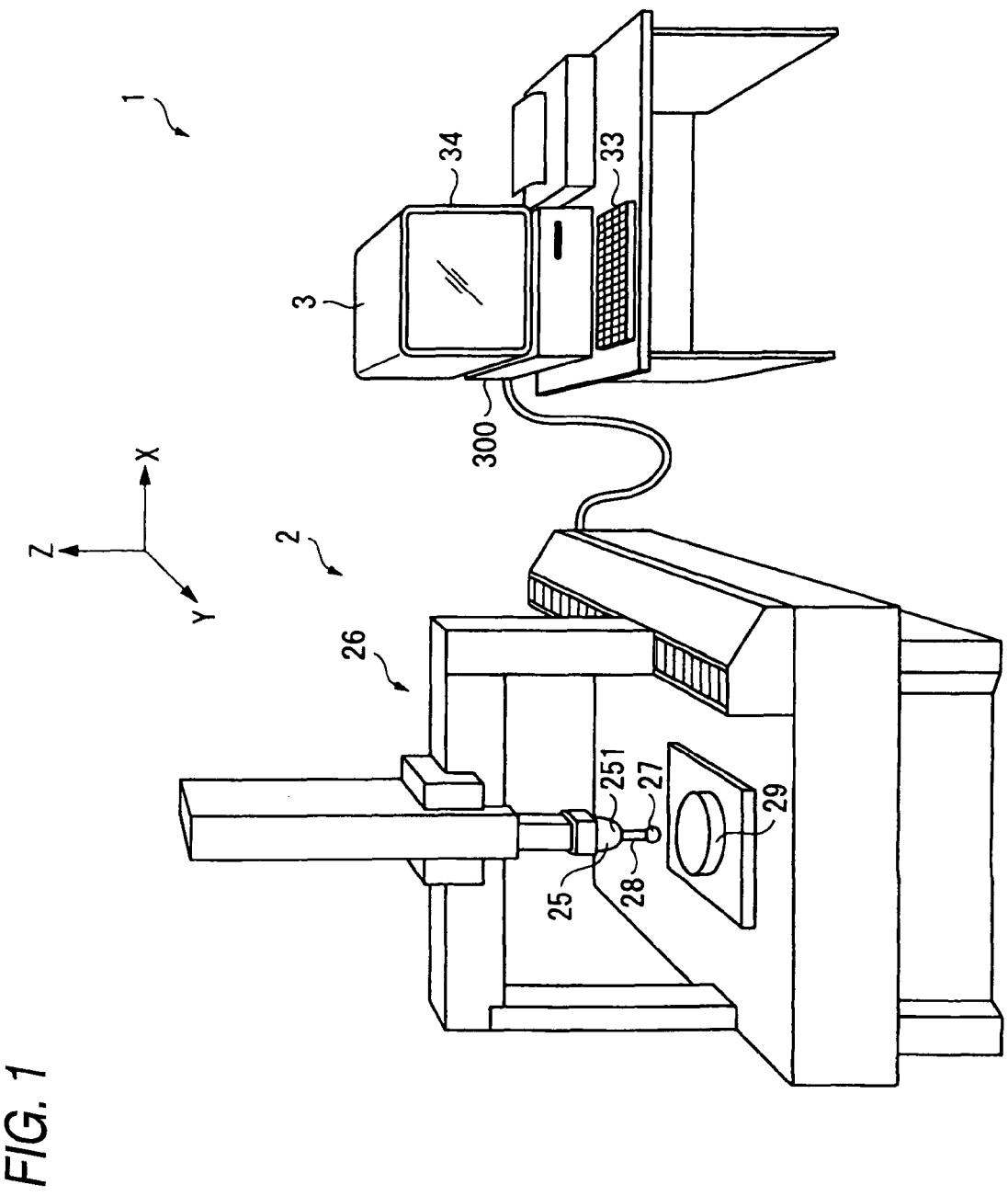
FIG. 1 is a perspective diagram showing a form measuring instrument pertaining to a first embodiment of the present invention.

1. Overall Configuration of Coordinate Measuring Machine

A first embodiment of the present invention will be described below on the basis of the drawings. Hereinafter, the same reference numerals will be given to the same functional portions as those of the conventional coordinate measuring machine 1 described in the "Related Art" section, and description of those same functional portions will be omitted or simplified.

FIG. 1 is a perspective diagram showing a coordinate measuring machine 1 that serves as a form measuring instrument pertaining to the present embodiment.

The coordinate measuring machine 1 is equipped with a measuring machine body 2 and a PC 3.

2. Overall Configuration of Measuring Machine Body

The measuring machine body 2 is equipped with: a rotary table 29 that is capable of rotating an workpiece that is placed thereon; a rotation angle sensor 291 (see FIG. 2) that detects the rotation angle of the rotary table 29; a probe 25 that has a stylus 28 on whose distal end portion a stylus tip 27 is disposed, a support component 251 that supports the proximal end portion of the stylus 28 such that the stylus 28 may freely slide in a predetermined triaxial direction, and an amount-of-displacement amount sensor 252 (see FIG. 2) that detects the amount of displacement of the stylus 28 in the triaxial direction; a moving mechanism 26 that is capable of moving the probe 25 in the triaxial direction; and a coordinate value sensor 261 (see FIG. 2) that is disposed on the moving mechanism 26 and includes a scale or the like that detects the coordinate values of the probe 25.

3. Overall Configuration of PC

Figure 2:
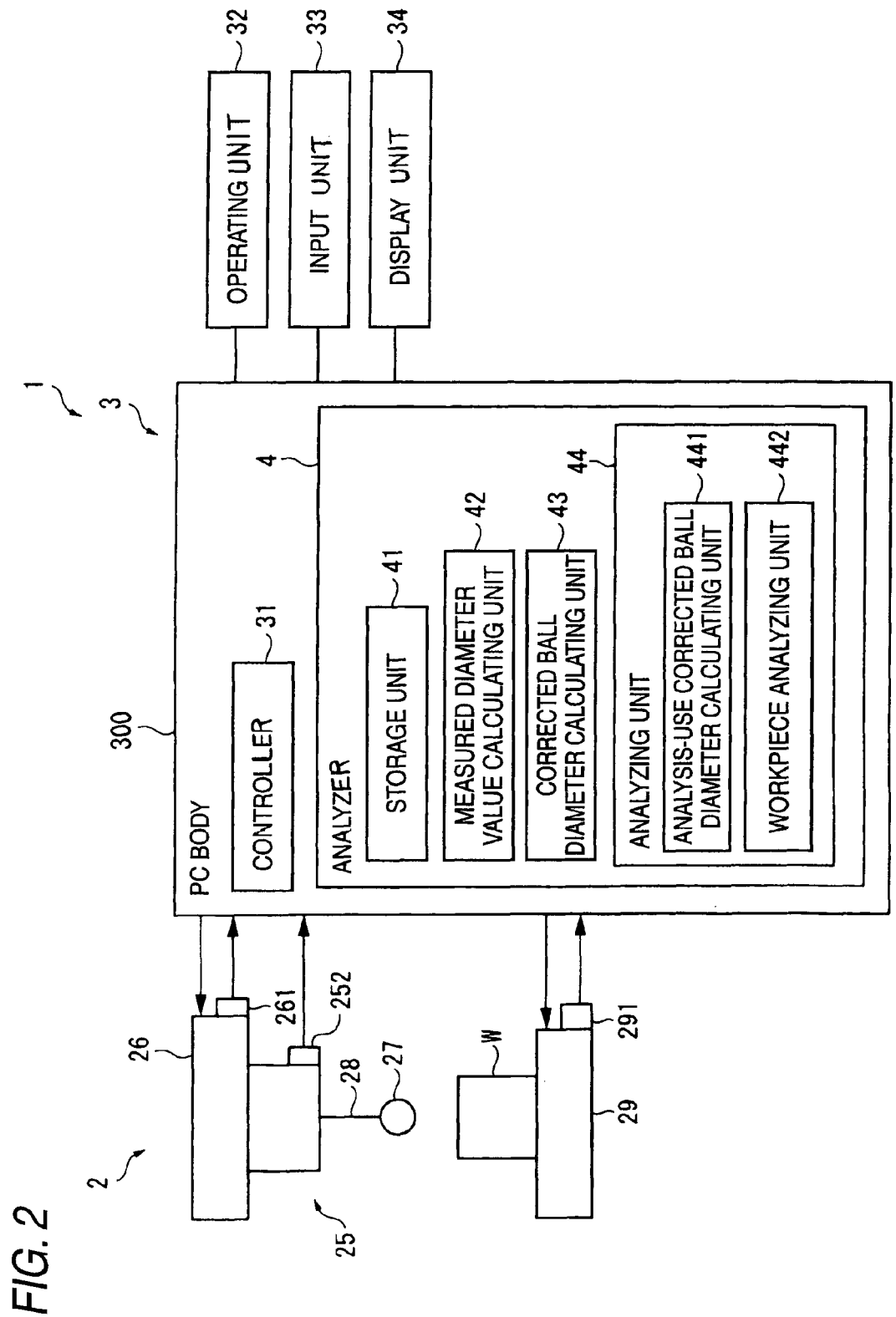
FIG. 2 is a diagram showing the configuration of a PC.

FIG. 2 is a diagram showing the configuration of the PC 3.

The PC 3 controls the measuring machine body 2 and causes the stylus tip 27 to touch an workpiece W to thereby measure the workpiece W. Additionally, the PC 3 uses detected values that are detected from each of the sensors 252, 261 and 291 when the stylus tip 27 and the workpiece W touch and corrected ball diameters that are predetermined calculatory diameter values of the stylus tip 27 and performed a predetermined operation to thereby determine the dimensions and the profile of the workpiece W.

The PC 3 is equipped with: a PC body 300 that has a controller 31 and an analyzer 4; and an operating unit 32, an input unit 33 and a display unit 34 that are connected to the PC body 300.

The controller 31 controls the rotary table 29 and the moving mechanism 26 under the control of the analyzer 4 or in accordance with a command inputted from the operating unit 32 and causes the stylus tip 27 to touch the workpiece W to thereby measure the workpiece W.

The operating unit 32 is for manually operating the rotary table 29 and the moving mechanism 26 via the controller 31.

The input unit 33 is for inputting measurement conditions and the like to the PC body 300.

The display unit 34 is for displaying measurement results that are outputted from the PC body 300.

4. Overall Configuration of Analyzer

The analyzer 4 is equipped with a storage unit 41, a measured diameter value calculating unit 42, a corrected ball diameter calculating unit 43 and an analyzing unit 44.

5. Configuration of Storage Unit

Figure 3:
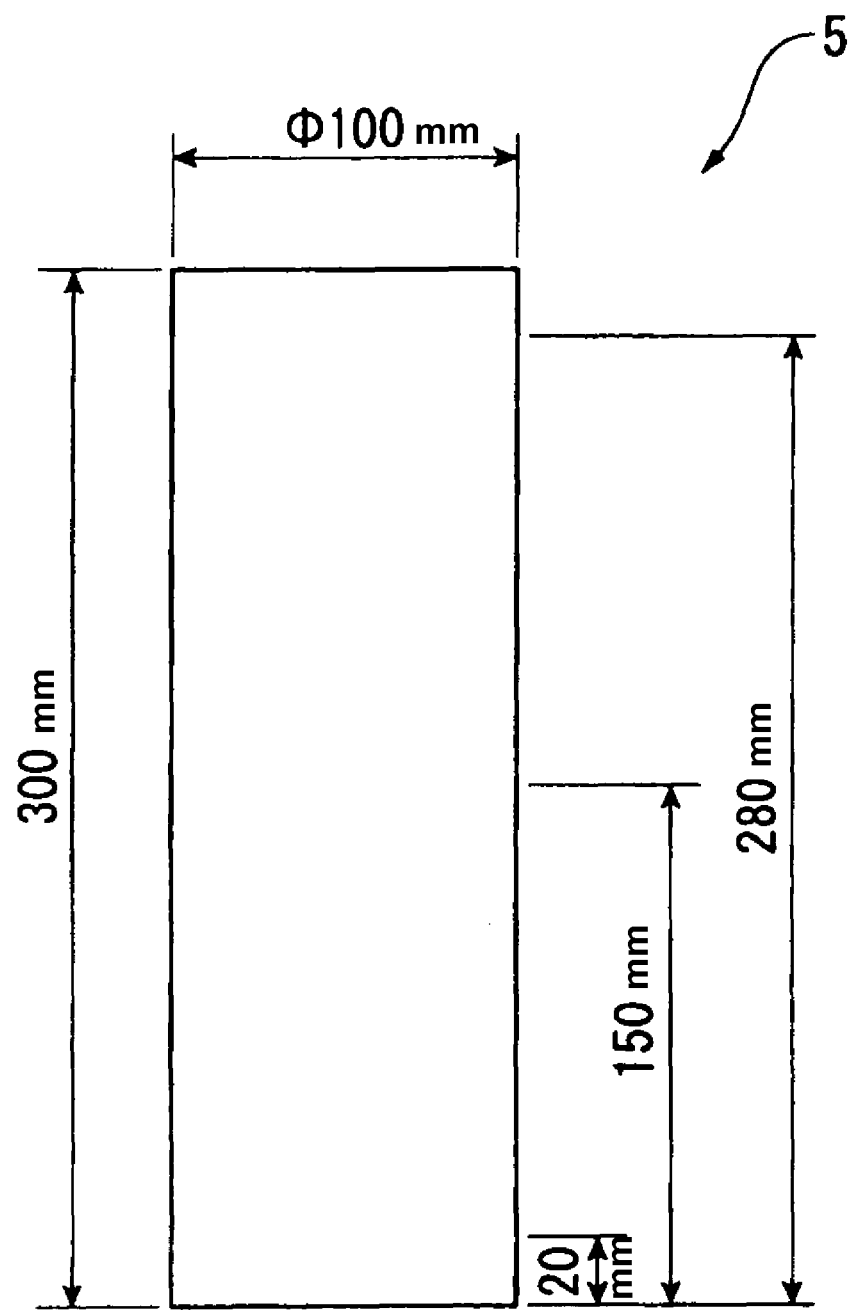
FIG. 3 is a diagram showing a cylindrical square.

FIG. 3 is a diagram showing a cylindrical square 5 whose outer diameter value is already known.

The storage unit 41 stores outer diameter-calibrated diameter values Do of plural height positions (the upper end portion, the central portion and the lower end portion in the height direction) of the outer peripheral surface of the cylindrical square 5 that have been valued beforehand by a predetermined high-precision coordinate measuring machine. Specifically, in the present embodiment, a cylindrical square whose diameter is 100 mm and whose height is 300 mm is used as the cylindrical square 5, and the storage unit 41 stores calibrated diameter values Do (j) (j=1 to 3) of height positions of 20 mm, 150 mm and 280 mm from the bottom surface of the cylindrical square 5. The storage unit 41 may also store the outer diameter-calibrated diameter values Do of the outer peripheral surface of the cylindrical square 5 evenly across each height position rather than at just three points, and the later-described corrected ball diameter calculating unit 43 may also be configured to read from the storage unit 41 the outer diameter-calibrated diameter values Do of the height positions needed for calculation.

Figure 4:
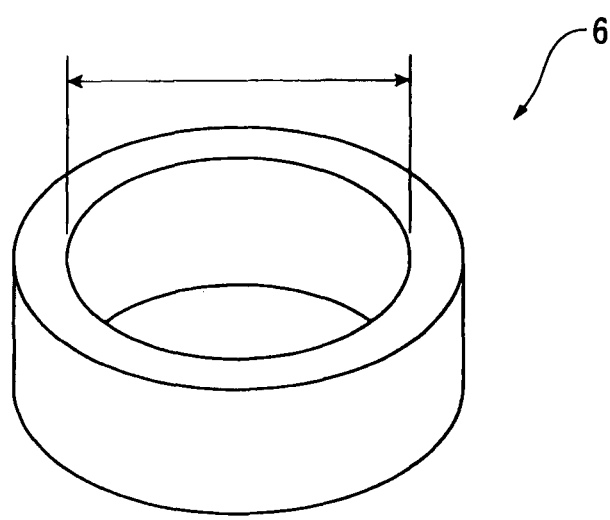
FIG. 4 is a diagram showing a ring gauge.

FIG. 4 is a diagram showing a ring gauge 6 whose inner diameter value is already known.

Further, the storage unit 41 stores inner diameter-calibrated diameter values Di of the inner peripheral surface of the ring gauge 6 that have been valued beforehand by a predetermined high-precision coordinate measuring machine. These inner diameter-calibrated diameter values Di become predetermined values, and hereinafter, for the sake of convenience, the inner diameter-calibrated diameter values Di will be written as Di (j) (j=1 to 3). However, the values of the inner diameter-calibrated diameter values Di do not change in j=1 to 3. In the present embodiment, the cylindrical square 5, and the ring gauge 6 and a later-described spacer 7 (see FIG. 7), become a reference gauge, and the outer peripheral surface of the cylindrical square 5 and the inner peripheral surface of the ring gauge 6 become reference peripheral surfaces of the reference gauge.

The storage unit 41 also has the function of storing various values calculated by the controller 31 and the analyzer 4.

6. Configuration of Measured Diameter Value Calculating Unit

Figure 5:
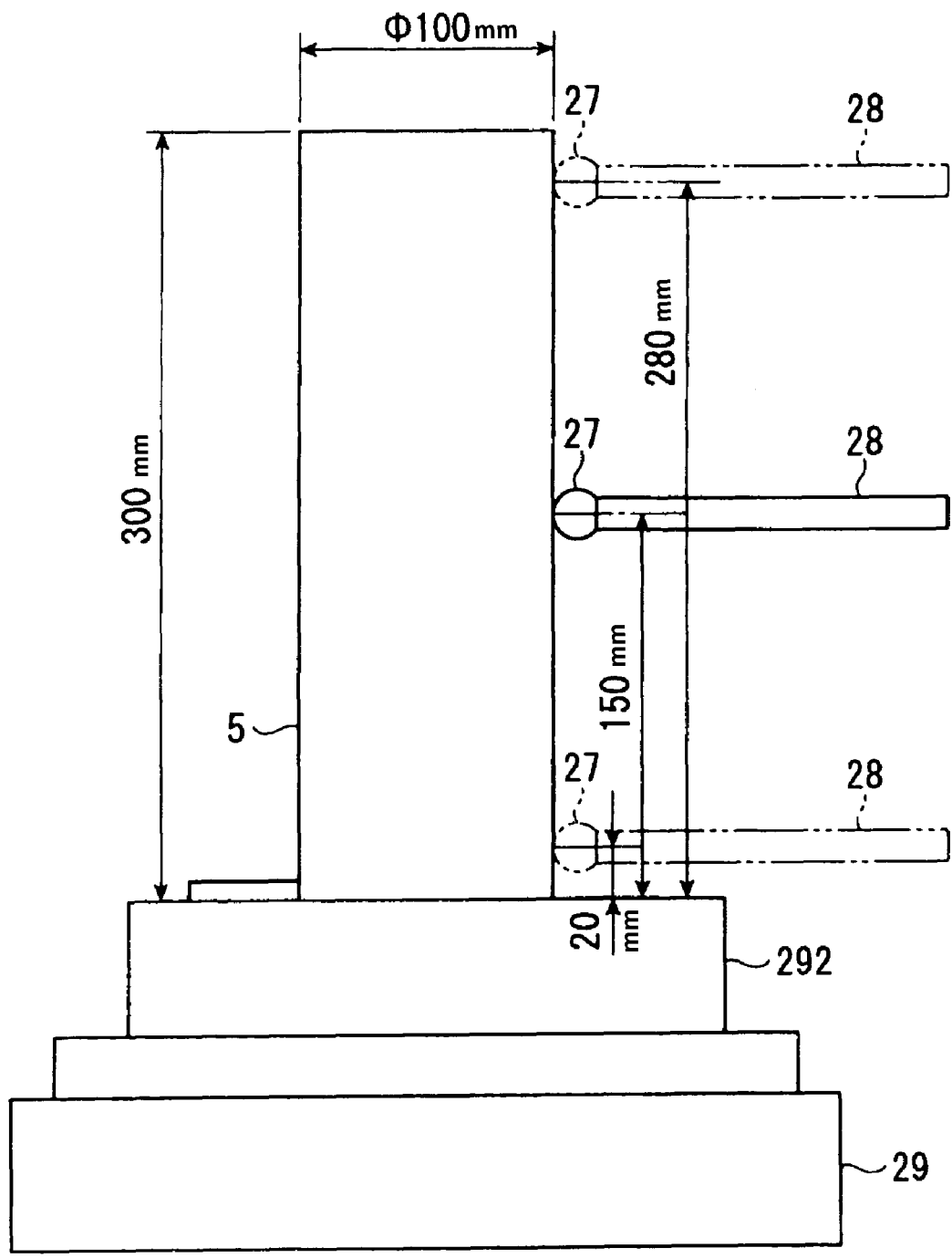
FIG. 5 is a diagram showing measurement of the cylindrical square by a measured diameter value calculating unit.
Figure 6:
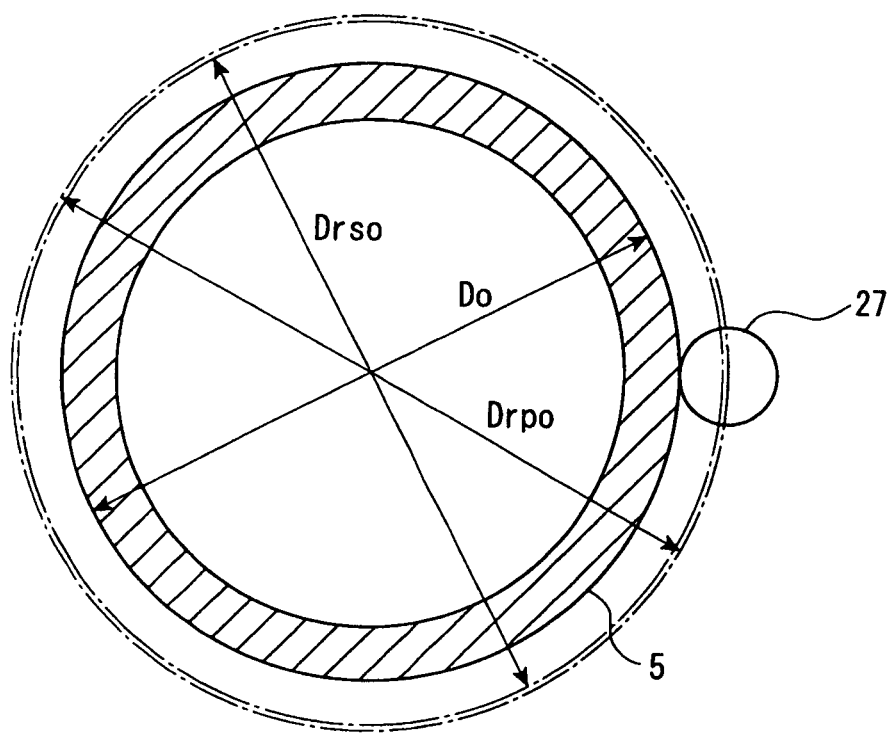
FIG. 6 is a diagram showing each diameter value pertaining to the outer diameter of the cylindrical square.

6-1. Calculation of Outer Diameter Measured Diameter Values Drpo by Point Measurement FIG. 5 is a diagram showing measurement of the cylindrical square 5 by the measured diameter value calculating unit 42. FIG. 6 is a diagram showing each diameter value Do, Drpo and Drso pertaining to the outer diameter of the cylindrical square 5.

The measured diameter value calculating unit 42 controls the rotary table 29 and the moving mechanism 26 via the controller 31 and causes the stylus tip 27 to touch plural measurement sites on the same circumference in each of the height positions (20 mm, 150 mm and 280 mm from the bottom surface) of the outer peripheral surface of the cylindrical square 5 in a state where the cylindrical square 5 has been caused to rotate to thereby point-measure the measurement sites.

The cylindrical square 5 is fixed on a central axis of the rotary table 29 by a chuck 292 of the rotary table 29. Further, the measured diameter value calculating unit 42 drives the rotary table 29, for example, and causes the stylus tip 27 to move forward and backward only in one direction (the transverse direction in FIG. 5) in a state where the cylindrical square 5 has been caused to rotate to thereby point-measure four measurement sites offset 90° each in the circumferential direction on the same circumference in each of the height positions of the outer peripheral surface of the cylindrical square 5.

Additionally, the measured diameter value calculating unit 42 calculates, per each of the height positions, outer diameter measured diameter values Drpo (j) (j=1 to 3) that are diameter values of a circle passing through the neighborhood of center points of the stylus tip 27 when the stylus tip 27 has touched each of the measurement sites. The circle passing through the neighborhood of the center points of the stylus tip 27 when the stylus tip 27 has touched each of the measurement sites refers to a regression circle that fits the state of distribution of the center points of the stylus tip 27, such as a least square circle where the square sum of the distances from the center points of the stylus tip 27 becomes a minimum. Hereafter also, the same will be true.

In the outer diameter measured diameter values Drpo (j) (j=1 to 3) that have been calculated per each of the height positions, there are included error that arises by measuring the cylindrical square 5 while causing the cylindrical square 5 to rotate, error that arises depending on the height position of the cylindrical square 5 that is measured, error that arises by performing point measurement, and error resulting from measuring the outer peripheral surface.

6-2. Calculation of Outer Diameter Measured Diameter Values Drso by Scanning measurement Further, the measured diameter value calculating unit 42 controls the rotary table 29 and the moving mechanism 26 via the controller 31 and synchronously profile-measures, one circumference at a predetermined sampling pitch, each of the height positions of the outer peripheral surface of the cylindrical square 5 in a state where the cylindrical square 5 has been caused to rotate to thereby calculate outer diameter measured diameter values Drso (j) (j=1 to 3) resulting from scanning measurement per each of the height positions.

In the outer diameter measured diameter values Drso (j) (j=1 to 3), there are included error that arises by measuring the cylindrical square 5 while causing the cylindrical square 5 to rotate, error that arises depending on the height position of the cylindrical square 5 that is measured, error that arises by performing scanning measurement, and error resulting from measuring the outer peripheral surface.

The measurement conditions at the time of scanning measurement, for example, conditions such as the profiling speed of the probe 25 that is moved by the moving mechanism 26 and the thrust amount of the stylus 28 at the time of measurement, are set to be the same conditions as conditions when actually profile-measuring the workpiece W.

Figure 7:
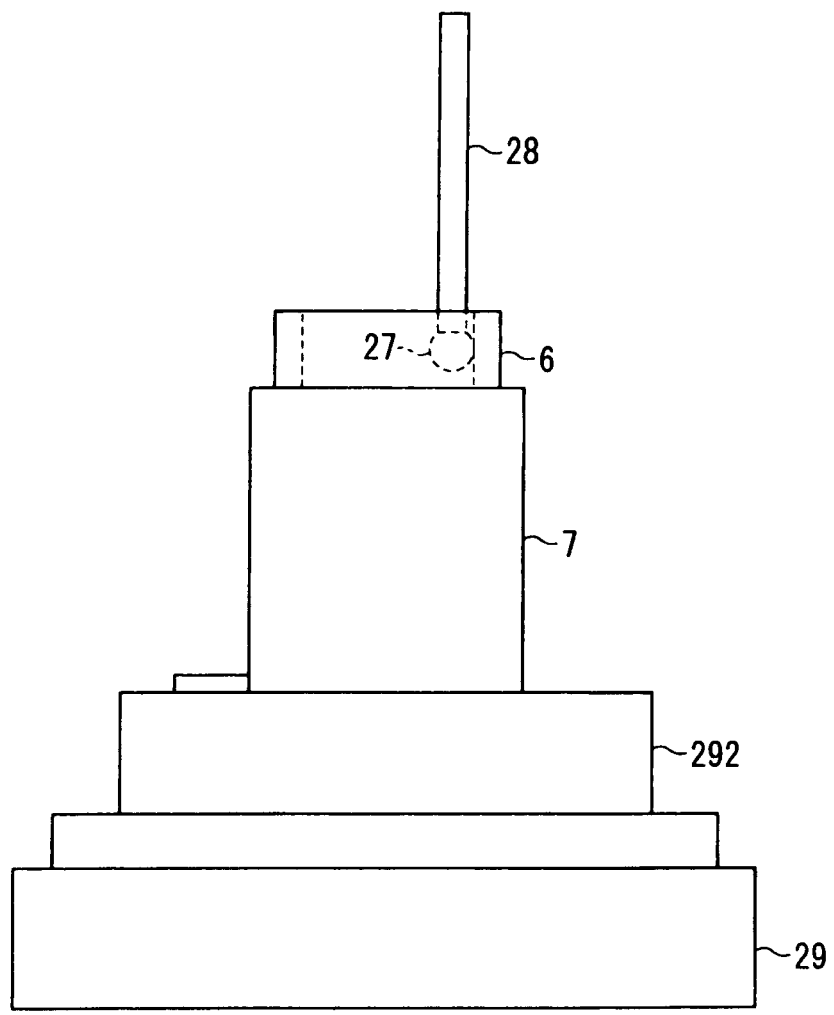
FIG. 7 is a diagram showing measurement of the ring gauge by the measured diameter value calculating unit.
Figure 8:
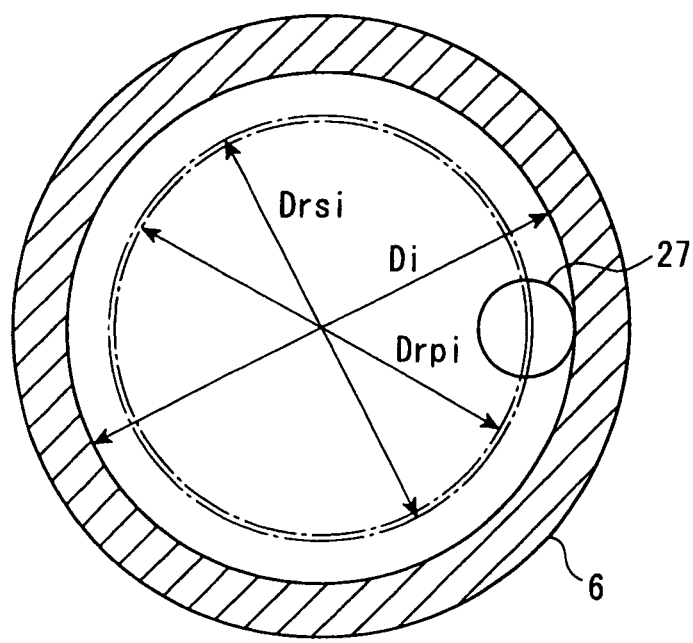
FIG. 8 is a diagram showing each diameter value pertaining to the inner diameter of the cylindrical square.

6-3. Calculation of Inner Diameter Measured Diameter Values Drpi by Point Measurement FIG. 7 is a diagram showing measurement of the ring gauge 6 by the measured diameter value calculating unit 42. FIG. 8 is a diagram showing each diameter value Di, Drpi and Drsi pertaining to the inner diameter of the ring gauge 6.

Further, the measured diameter value calculating unit 42 similarly controls the rotary table 29 and the moving mechanism 26 via the controller 31 and point-measures the inner peripheral surface of the ring gauge 6 that has been placed at each of the height positions (20 mm, 150 mm and 280 mm from the rotary table 29) in a state where the ring gauge 6 has been caused to rotate to thereby calculate inner diameter measured diameter values Drpi (j) (j=1 to 3) resulting from point measurement for each of the height positions.

The ring gauge 6 is placed at each of the height positions (the height positions of 150 mm and 280 mm from the rotary table 29) by a spacer 7 fixed by the chuck 292. The ring gauge 6 is fixed by an adhesive to the spacer 7. Further, when the ring gauge 6 is to be measured at the height position of 20 mm from the rotary table 29, the spacer 7 is not used and the ring gauge 6 is placed directly on the rotary table 29 and measured.

In the inner diameter measured diameter values Drpi (j) (j=1 to 3), there are included error that arises by measuring the ring gauge 6 while causing the ring gauge 6 to rotate, error that arises depending on the height position of the ring gauge 6 that is measured, error that arises by performing point measurement, and error resulting from measuring the inner peripheral surface.

6-4. Calculation of Inner Diameter Measured Diameter Values Drsi by Scanning Measurement Further, the measured diameter value calculating unit 42 controls the rotary table 29 and the moving mechanism 26 via the controller 31 and synchronously profile-measures the inner peripheral surface of the ring gauge 6 that has been placed at each of the height positions in a state where the ring gauge 6 has been caused to rotate to thereby calculate inner diameter measured diameter values Drsi (j) (j=1 to 3) resulting from scanning measurement for each of the height positions.

In the inner diameter measured diameter values Drsi (j) (j=1 to 3), there are included error that arises by measuring the ring gauge 6 while causing the ring gauge 6 to rotate, error that arises depending on the height position of the ring gauge 6 that is measured, error that arises by performing scanning measurement, and error resulting from measuring the inner peripheral surface.

7. Configuration of Corrected Ball Diameter Calculating Unit

The corrected ball diameter calculating unit 43, as shown in expression (3) below, reads the calibrated diameter values Do per each of the height positions from the storage unit 41 and calculates, per each of the height positions, corrected ball diameters drpo that are calculatory diameter values of the stylus tip 27 from the calibrated diameter values Do per each of the height positions and from the outer diameter measured diameter values Drpo that have been calculated per each of the height positions by performing point measurement.

$$drpo(j) = Drpo(j) - Do(j) \quad (j=1 \text{ to } 3) \tag{3}$$

In the corrected ball diameters drpo (j) that have been calculated per each of the height positions, there are included the errors included in the outer diameter measured diameter values Drpo (j), that is, error that arises by measuring the cylindrical square 5 while causing the cylindrical square 5 to rotate, error that arises depending on the height position of the cylindrical square 5 that is measured, error that arises by performing point measurement, and error resulting from measuring the outer peripheral surface.

The corrected ball diameter calculating unit 43 similarly calculates corrected ball diameters drpi, drso and drsi per each of the height positions as shown in expressions (4) to (6) below. In these corrected ball diameters drpi, drso and drsi also, the errors corresponding to each of the measured diameter values Drpi, Drso and Drsi are included.

$$drpi(j) = Di(j) - Drpi(j) \quad (j=1 \text{ to } 3) \tag{4}$$

$$drso(j) = Drso(j) - Do(j) \quad (j=1 \text{ to } 3) \tag{5}$$

$$drsi(j) = Di(j) - Drsi(j) \quad (j=1 \text{ to } 3) \tag{6}$$

8-1. Overall Configuration of Analyzing Unit

The analyzing unit 44 uses the corrected ball diameters drpi, drso and drsi that have been calculated by the corrected ball diameter calculating unit 43 to analyze the profile and the like of the workpiece W. This analyzing unit 44 is equipped with an analysis-use corrected ball diameter calculating unit 441 and a workpiece analyzing unit 442.

8-2. Configuration of Analysis-Use Corrected Ball Diameter Calculating Unit

The analysis-use corrected ball diameter calculating unit 441 calculates, depending on the measurement method (point measurement, scanning measurement) of the controller 31, the measurement target (outer peripheral surface, inner peripheral surface) and the height position from the bottom surface of the workpiece W that the controller 31 measures, analysis-use corrected ball diameters that are used when analyzing the profile and the like of the workpiece W from the corrected ball diameters drpo, drpi and drsi that have been calculated per each of the height positions.

Specifically, the analysis-use corrected ball diameter calculating unit 441 calculates, and stores in the storage unit 41, approximate functions such as cubic functions that are functions of the height positions utilizing the least square method or the like from the corrected ball diameters drpo, drpi, drso and drsi per each of the height positions. Additionally, when the controller 31 has measured the workpiece W, the analysis-use corrected ball diameter calculating unit 441 reads the approximate function corresponding to the measurement method and measurement target from the storage unit and calculates, from that approximate function, the analysis-use corrected ball diameter corresponding to the height position from the bottom surface of the workpiece W that is measured.

When the controller 31 performs measurement of the outer peripheral surface of the workpiece W by point measurement, for example, the analysis-use corrected ball diameter calculating unit 441 reads from the storage unit 41 the approximate function that has been calculated on the basis of the corrected ball diameter drpo that has been calculated by point-measuring the outer peripheral surface of the cylindrical square 5 and calculates, from that approximate function, the analysis-use corrected ball diameter corresponding to the height position of the workpiece W that the controller 31 measures.

In the analysis-use corrected ball diameter that is calculated by the analysis-use corrected ball diameter calculating unit 441, there included error that arises by measuring the reference gauge (the cylindrical square 5, and the ring gauge 6 and spacer 7) while causing the reference gauge to rotate, error that arises depending on the height position of the reference gauge that is measured, error that arises depending on the measurement method (point measurement, scanning measurement), and error that arises depending on the measurement target (outer peripheral surface, inner peripheral surface).

8-3. Configuration of Workpiece Analyzing Unit

When the controller 31 performs measurement of the workpiece W, the workpiece analyzing unit 442 uses the detected values that are detected by each of the sensors 252, 261 and 291 and the analysis-use corrected ball diameters that are calculated by the analysis-use corrected ball diameter calculating unit 441 to analyze the dimensions and the profile of the workpiece W.

Here, it has already been noted in the "Related Art" section that when the rotary table 29 is used to measure the workpiece W, error ends up arising in the analysis result even though the error is slight and that that error is affected by the height position of the workpiece W that is measured, but the error is also affected by the measurement method (point measurement, scanning measurement) and the measurement target (outer peripheral surface, inner peripheral surface).

Figure 13:
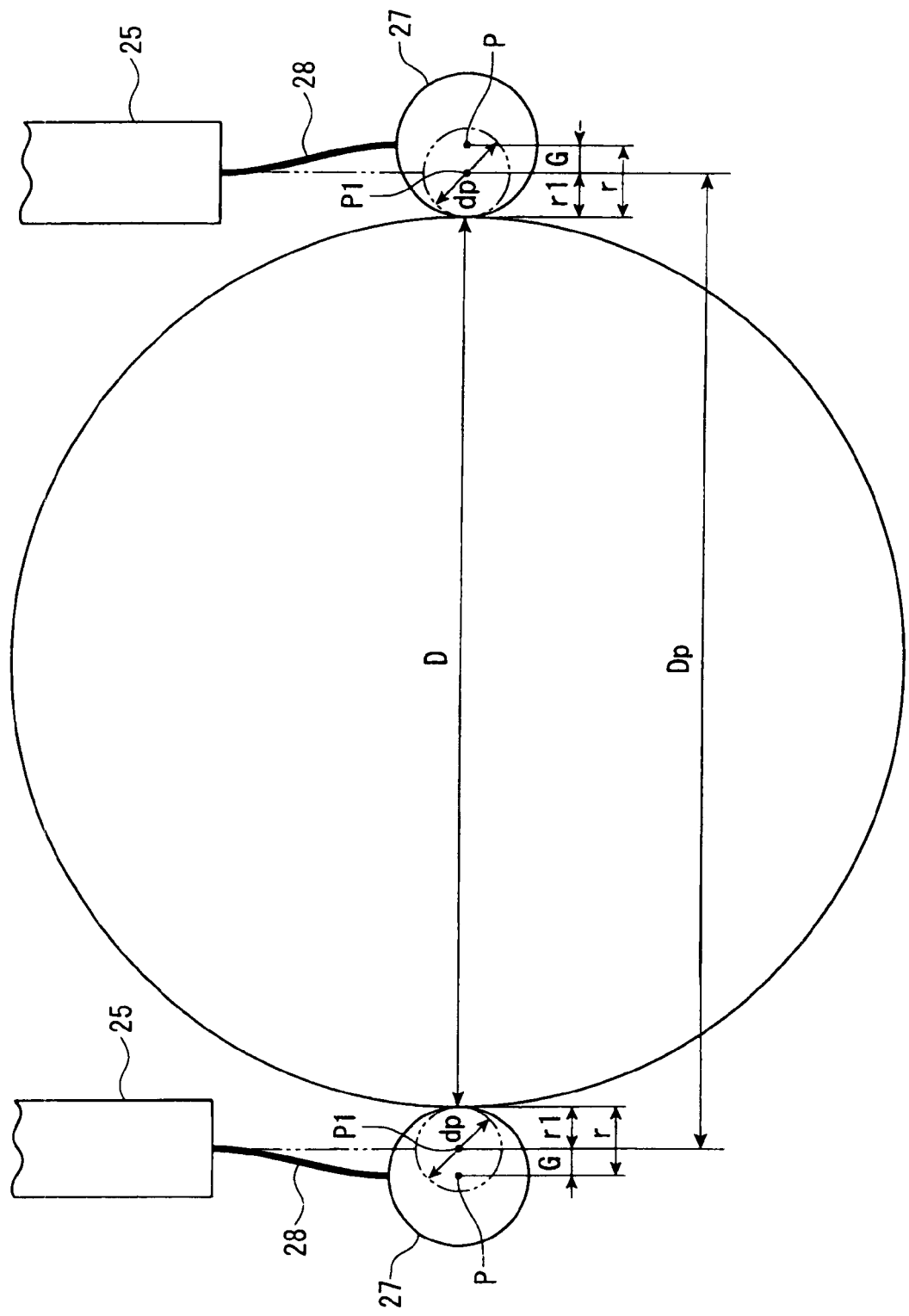
FIG. 13 is a diagram showing center points of the stylus tip that are recognized at the time of point measurement.
Figure 14:
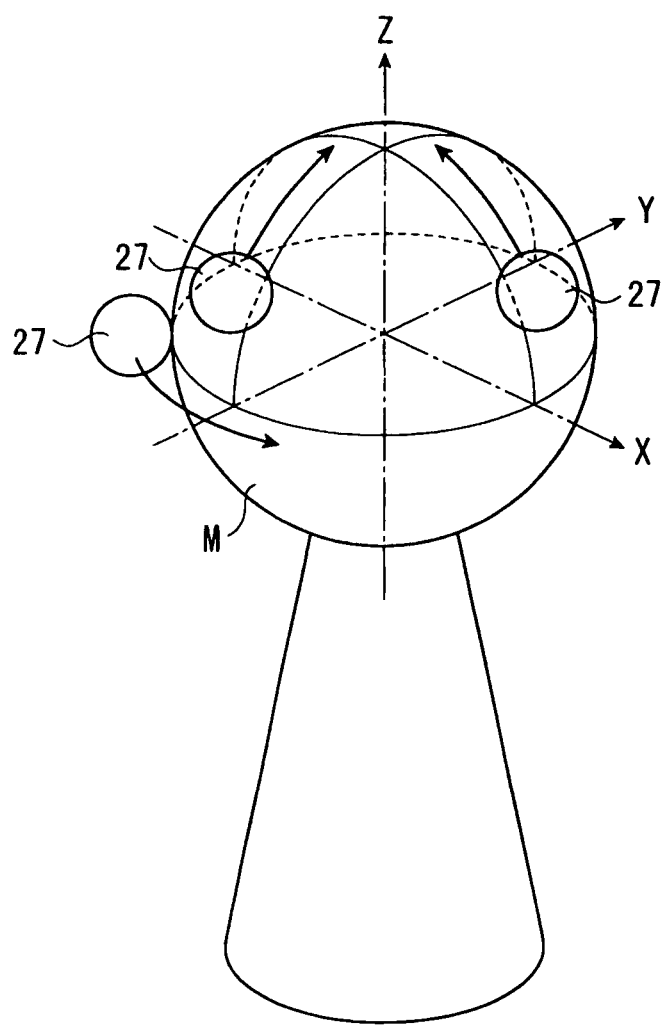
FIG. 14 is a diagram showing calibration performed by scanning measurement.

Consequently, to describe this with reference to FIG. 13, when the rotary table 29 is used to measure the workpiece W, the center points of the stylus tip 27 are recognized by the PC 3 as being in positions P1 including errors G that arise depending on the measurement conditions, that is, error that arises by measuring the workpiece W while causing the workpiece W to rotate, error that arises depending on the height position of the workpiece W that is measured, error that arises depending on the measurement method (point measurement, scanning measurement), and error that arises depending on the measurement target (outer peripheral surface, inner peripheral surface).

Thus, the workpiece analyzing unit 442 determines the radius r1 of the stylus tip 27 including each of the errors G on the basis of the analysis-use corrected ball diameters that have been calculated by the analysis-use corrected ball diameter calculating unit 441 and determines positions offset by an amount equal to the radius r1 of the stylus tip 27 from the center points P1 of the stylus tip 27 that it recognizes. Thus, the workpiece analyzing unit 442 can determine the points of contact between the stylus tip 27 and the workpiece W while suppressing each of the errors G that arise depending on the measurement conditions and can analyze the profile and the like of the workpiece W with high precision.

Figure 9:
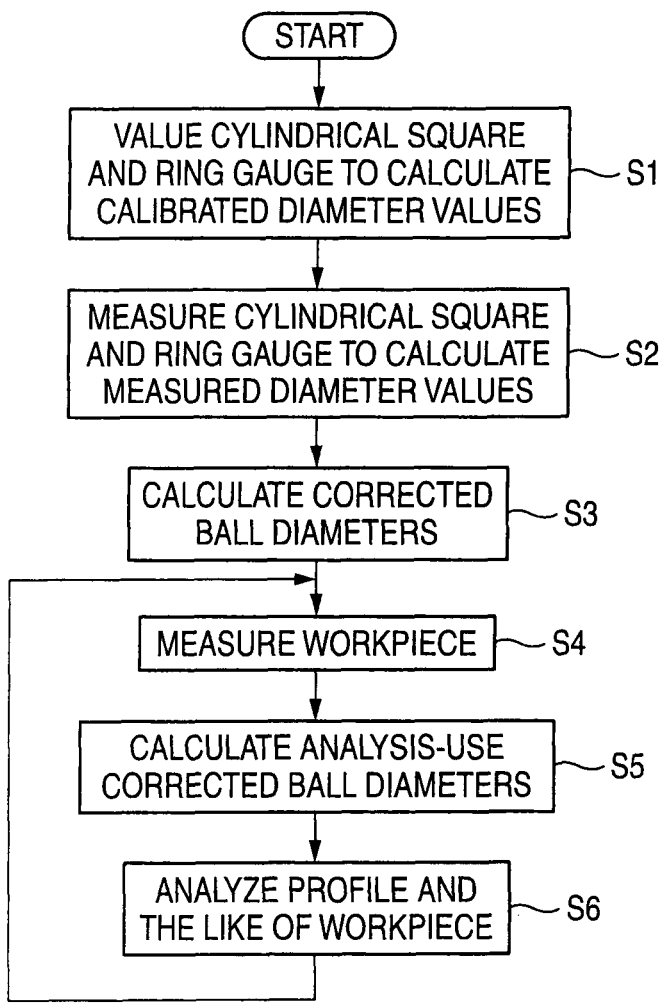
FIG. 9 is a flowchart showing a corrected ball diameter calculating method and a method of analyzing the profile and the like of an workpiece.
Figure 10:
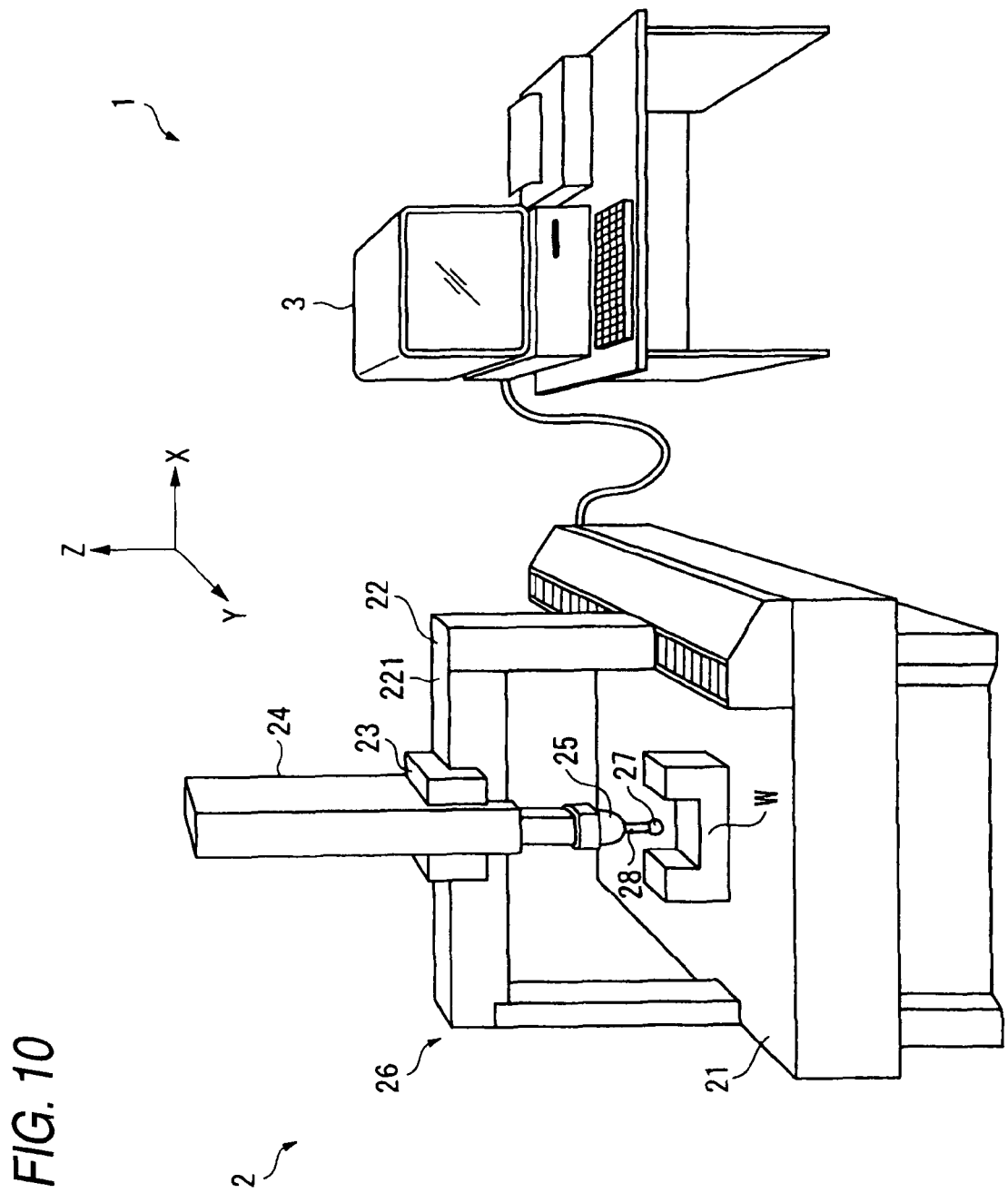
FIG. 10 is a diagram showing a conventional coordinate measuring machine.
Figure 11:
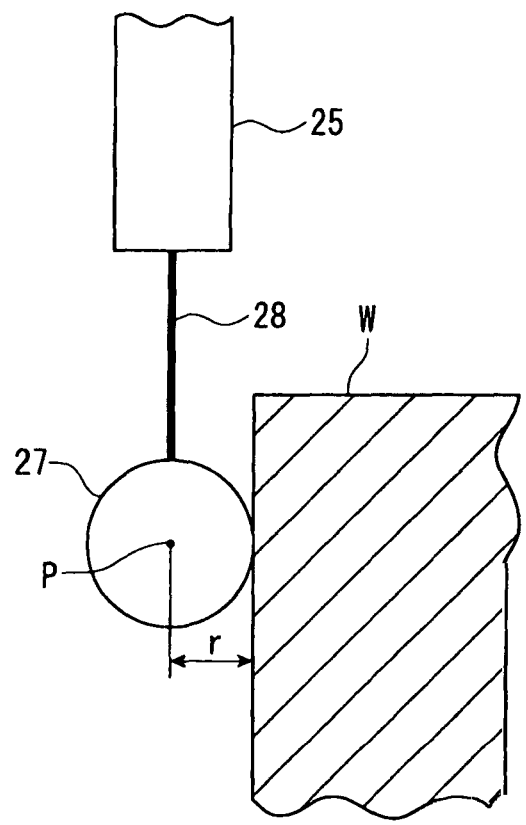
FIG. 11 is a diagram for describing a point of contact between a stylus tip and an workpiece.
Figure 12:
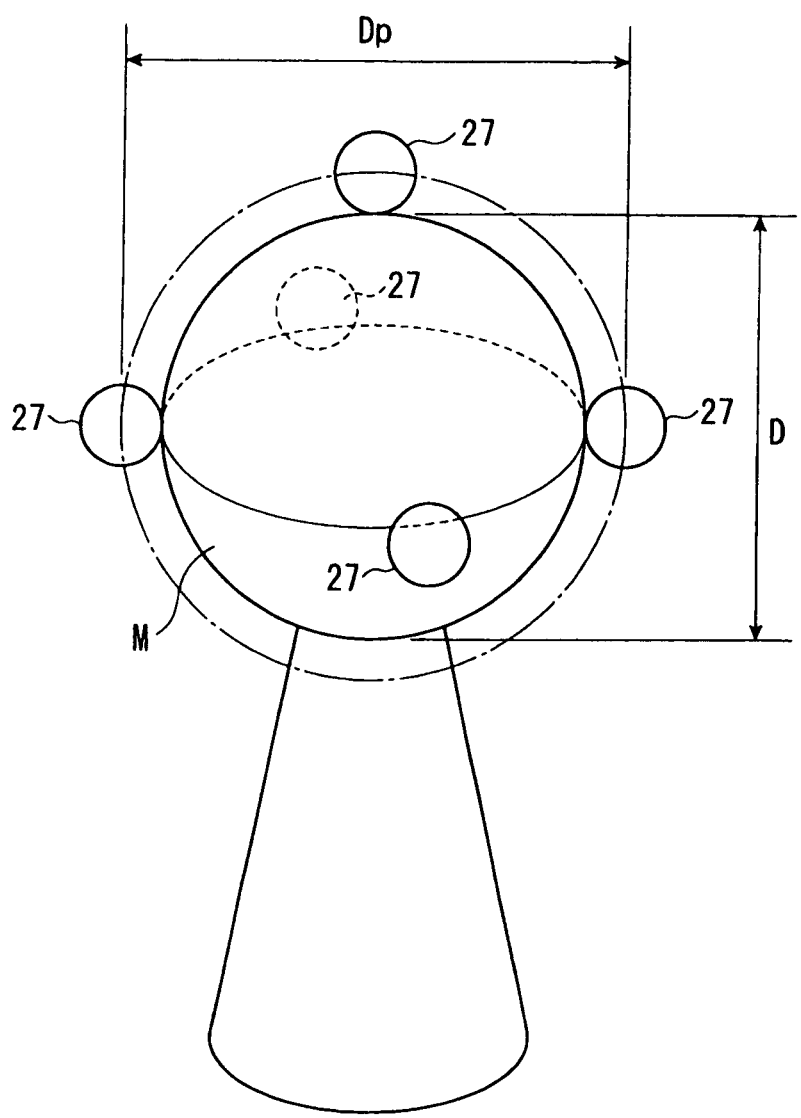
FIG. 12 is a diagram showing calibration.

9. Description of Corrected Ball Diameter Calculating Method and Method of Analyzing Profile and the Like of Workpiece A corrected ball diameter calculating method and a method of analyzing the profile and the like of the workpiece will be briefly described below with reference to the flowchart of FIG. 9.

First, a worker prepares the cylindrical square 5, and the ring gauge 6 and the spacer 7, as the reference gauge and places the cylindrical square 5 on a predetermined high-precision coordinate measuring machine. Then, the predetermined high-precision coordinate measuring machine is operated by the worker or the like, whereby the predetermined high-precision coordinate measuring machine values the outer diameter-calibrated diameter values Do (j) (j=1 to 3) of the plural height positions (the upper end portion, the central portion and the lower end portion in the height direction) of the outer peripheral surface of the cylindrical square 5. These values are stored by the worker or the like in the storage unit 41 of the coordinate measuring machine 1 that is used to measure the workpiece W. Thereafter, the ring gauge 6 is placed in each of the height positions via the spacer 7 by the worker on the predetermined high-precision coordinate measuring machine, and the predetermined high-precision coordinate measuring machine values the inner diameter-calibrated diameter values Di (j) (j=1 to 3) of the inner peripheral surface of the ring gauge 6 at each of the height positions. These values are also stored by the worker or the like in the storage unit 41 of the coordinate measuring machine 1 that is used to measure the workpiece W (calibrated diameter value calculating step S1).

After the calibrated diameter value calculating step S1, the worker places the cylindrical square 5 on the rotary table 29 of the coordinate measuring machine 1. Then, the coordinate measuring machine 1 is operated by the worker or the like, whereby the measured diameter value calculating unit 42 controls the rotary table 29 and the moving mechanism 26 via the controller 31, point-measures the plural measurement sites on the same circumference at each of the height positions of the outer peripheral surface of the cylindrical square 5 in a state where the cylindrical square 5 has been caused to rotate, and calculates, per each of the height positions, the outer diameter measured diameter values Drpo (j) (j=1 to 3) that are diameter values of a circle passing through the neighborhood of the center points of the stylus tip 27 when the stylus tip 27 has touched each of the measurement sites. Further, the measured diameter value calculating unit 42 synchronously profile-measures each of the height positions of the outer peripheral surface of the cylindrical square 5 to thereby calculate the outer diameter measured diameter values Drso (j) (j=1 to 3) resulting from scanning measurement per each of the height positions. Thereafter, the worker places the ring gauge 6 in each of the height positions via the spacer 7 on the rotary table 29, and the measured diameter value calculating unit 42 point-measures the inner peripheral surface of the ring gauge 6 that has been placed in each of the height positions in a state where the ring gauge 6 has been caused to rotate to thereby calculate the inner diameter measured diameter values Drpi (j) (j=1 to 3) resulting from point measurement per each of the height positions. Further, the measured diameter value calculating unit 42 profile-measures the inner peripheral surface of the ring gauge 6 that has been placed in each of the height positions to thereby calculate the inner diameter measured diameter values Drsi (j) (j=1 to 3) resulting from scanning measurement per each of the height positions (measured diameter value calculating step S2).

After the measured diameter value calculating step S2, the corrected ball diameter calculating unit 43 calculates the corrected ball diameters drpo, drpi, drso and drsi from the calibrated diameter values Do and Di and the measured diameter values Drpo, Drpi, Drso and Drsi that have been calculated per each of the height positions as shown in expressions (3) to (6) below (corrected ball diameter calculating step S3).

$$drpo(j)=Drpo(j)-Do(j)\ (j=1\ \text{to}\ 3) \tag{3}$$

$$drpi(j)=Di(j)-Drpi(j)\ (j=1\ \text{to}\ 3) \tag{4}$$

$$drso(j)=Drso(j)-Do(j)\ (j=1\ \text{to}\ 3) \tag{5}$$

$$drsi(j)=Di(j)-Drsi(j)\ (j=1\ \text{to}\ 3) \tag{6}$$

Because of the above steps S1 to S3, there can be measured the corrected ball diameters drpo, drpi, drso and drsi including error that arises by measuring the reference gauge (the cylindrical square 5, and the ring gauge 6 and the spacer 7) while causing the reference gauge to rotate, error that arises depending on the height position of the reference gauge that is measured, error that arises depending on the measurement method (point measurement, scanning measurement), and error that arises depending on the measurement target (outer peripheral surface, inner peripheral surface).

After the corrected ball diameter calculating step S3, the workpiece W is placed on the rotary table 29 by the worker. Then, under the control of the analyzing unit 44 or in accordance with operation of the operating unit 32 by the worker, the controller 31 controls the rotary table 29 and the moving mechanism 26 and causes the stylus tip 27 to touch the workpiece W to thereby measure the workpiece W (measuring step S4). After this measuring step S4, steps S5 and S6 below are performed, and then the measuring step S4 is again performed. That is, steps S5 and S6 below are performed between measurements of the workpiece W by the controller 31. In the present embodiment, an analyzing step is configured from these steps S4 to S6.

After the measuring step S4, the analysis-use corrected ball diameter calculating unit 441 calculates, from the corrected ball diameters drpo, drpi, drso and drsi that have been calculated depending on the measurement conditions, the analysis-use corrected ball diameters depending on the measurement conditions of the controller 31, that is, the height position of the workpiece W that that controller 31 measures, the measurement method (point measurement, scanning measurement) and the measurement target (outer peripheral surface, inner peripheral surface) (analysis-use corrected ball diameter calculating step S5).

After the analysis-use corrected ball diameter calculating step S5, the objet-to-be-measured analyzing unit 442 uses the detected values that are detected by each of the sensors 252, 261 and 291 and the analysis-use corrected ball diameters that are calculated by the analysis-use corrected ball diameter calculating unit 441 to analyze the dimensions and the profile of the workpiece W (workpiece analyzing step S6).

10. Effects of the Present Embodiment

According to the present embodiment described above, the following effects can be achieved.

(1) The corrected ball diameters drpo, drpi, drso and drsi are calculated by measuring the reference gauge (the cylindrical square 5, and the ring gauge 6 and the spacer 7) while causing the reference gauge to rotate, so the corrected ball diameters drpo, drpi, drso and drsi including error that arises by measuring the reference gauge (workpiece W) while causing the reference gauge (workpiece W) to rotate can be calculated. Further, the corrected ball diameters drpo, drpi, drso and drsi are calculated per each of the height positions by measuring the plural height positions of the reference gauge, so the corrected ball diameters drpo, drpi, drso and drsi including error that arises depending on the height position that is measured can be calculated per each of the height positions. Additionally, when the workpiece W has been measured while the workpiece W has been caused to rotate, the profile and the like of the workpiece W can be analyzed with high precision by using the corrected ball diameters drpo, drpi, drso and drsi including these errors to analyze the profile and the like of the workpiece W.

(2) The corrected ball diameters drpo and drpi are calculated by point-measuring the reference gauge in a state where the reference gauge has been caused to rotate, so the corrected ball diameters drpo and drpi including error that arises by performing point measurement can be calculated. Similarly, the corrected ball diameters drso and drsi are calculated by profile-measuring the reference gauge, so the corrected ball diameters drso and drsi including error that arises by performing scanning measurement can be calculated. Additionally, the corrected ball diameters drpo, drpi, drso and drsi corresponding to the method of measuring (point measurement, scanning measurement) the workpiece W are used to analyze the profile and the like of the workpiece W, so analysis error that arises depending on the measurement method can be suppressed, and the profile and the like of the workpiece W can be analyzed with higher precision.

(3) The corrected ball diameters drpo and drso are calculated by measuring the outer peripheral surface of the reference gauge in a state where the reference gauge has been caused to rotate, so the corrected ball diameters drpo and drso including error that arises by measuring the outer peripheral surface can be calculated. Similarly, the corrected ball diameters drpi and drsi are calculated by measuring the inner peripheral surface of the workpiece W, so the corrected ball diameters drpi and drsi including error that arises by measuring the inner peripheral surface of the workpiece W can be calculated. Additionally, the corrected ball diameters drpo, drpi, drso and drsi corresponding to the measurement target (outer peripheral surface, inner peripheral surface) are used to analyze the profile and the like of the workpiece W, so analysis error that arises depending on the measurement target can be suppressed, and the profile and the like of the workpiece W can be analyzed with higher precision.

(4) Approximate functions of the height positions are calculated from the corrected ball diameters drpo, drpi, drso and drsi that have been calculated per each of the height positions, and analysis-use corrected ball diameters corresponding to height positions that are measured are calculated from the approximate functions. In these analysis-use corrected ball diameters, there is included error that arises depending on the height position that is measured, and in the present embodiment, these analysis-use corrected ball diameters are used to analyze the profile and the like of the workpiece W, so analysis error that arises depending on the height position that is measured can be suppressed, and the profile and the like of the workpiece W can be analyzed with even higher precision.

Second Embodiment

The present embodiment is characterized in that the analysis-use corrected ball diameter calculating unit calculates, as the analysis-use corrected ball diameters, average values of the corrected ball diameters that have been calculated per each of the height positions by the corrected ball diameter calculating unit. The other configurations of the present embodiment are the same as those of the first embodiment. In this embodiment also, the same effects (1) to (3) as the first embodiment can be achieved, and the following effect can also be achieved.

(5) The analysis-use corrected ball diameter calculating unit calculates, as the analysis-use corrected ball diameters, average values of the corrected ball diameters that have been calculated per each of the height positions, so the amount of calculation that the form measuring instrument performs can be reduced in comparison to the first embodiment that calculates the analysis-use corrected ball diameters from predetermined approximate functions per each of the height positions that are measured.

Modifications of the Embodiments

The present invention is not limited to the preceding embodiments, and modifications and improvements within a scope that can achieve the object of the present invention are included in the present invention.

In the preceding embodiments, the outer peripheral surface and the inner peripheral surface of the reference gauge were measured to calculate the corrected ball diameters drpo, drpi, drso and drsi corresponding to the measurement target (outer peripheral surface, inner peripheral surface). However, the corrected ball diameters may also be calculated by measuring just either one of the outer peripheral surface and the inner peripheral surface of the reference gauge.

In the preceding embodiments, the reference gauge was point-measured and profile-measured to calculate the corrected ball diameters drpo, drpi, drso and drsi corresponding to the measurement method (point measurement, scanning measurement). However, the corrected ball diameters may also be calculated by measuring the reference gauge by just either one of point measurement and scanning measurement.

In the preceding embodiments, the measured diameter value calculating unit 42 measured the cylindrical square 5 and the ring gauge 6 via the controller 31 to thereby calculate the measured diameter values Drpo, Drpi, Drso and Drsi, but the measured diameter calculating unit 42 may also calculate the measured diameter values Drpo, Drpi, Drso and Drsi as a result of the rotary table 29 and the moving mechanism 26 being manually operated via the controller 31 and the cylindrical square 5 and the ring gauge 6 being measured.

The present invention can be utilized for a corrected ball diameter calculating method and for a form measuring instrument such as a roughness measuring machine, a contour profile measuring machine, a roundness measuring machine and a coordinate measuring machine.

What is claimed is:

1. A corrected stylus ball diameter calculating method for use in a form measuring instrument, the form measuring instrument including: a rotary table on which an workpiece is placed; a rotation angle sensor configured to detect the rotation angle of the rotary table; a probe including a stylus ball; and a coordinate value sensor configured to detect the coordinate values of the probe, the corrected stylus ball diameter calculating method comprising:
   preparing a reference gauge that has an outer reference cylindrical surface and an inner reference cylindrical surface;
   valuing of diameter values of the outer and inner reference cylindrical surfaces at a plurality of different height positions from a bottom surface of the reference gauge;
   calculating calibrated diameter values of the outer and inner reference cylindrical surfaces per each of the height positions;
   placing the reference gauge on the rotary table and causing the stylus ball to touch a plurality of measurement sites on the outer and inner reference cylindrical surfaces at each of the height positions;
   point-measuring and profile-measuring, in a state where the reference gauge is caused to rotate by driving the rotary table, per each of the height positions, diameter values of a regression circle that fits a state of distribution of center points of the stylus ball when the stylus ball has touched each of the measurement sites of the outer reference cylindrical surface and the inner reference cylindrical surface to thereby determine outer diameters of the reference gauge by the point-measurement, outer diameters of the reference gauge by the profile-measurement, inner diameters of the reference gauge by the point-measurement, and inner diameters of the reference gauge by the profile-measurement at each of the height positions; and
   calculating the corrected stylus ball diameters at each of the height positions based on the outer diameters of the reference gauge by the point-measurement, the outer diameters of the reference gauge by the profile-measurement, the inner diameters of the reference gauge by the point-measurement, and the inner diameters of the reference gauge by the profile-measurement at each of the height positions.

2. A form measuring instrument, comprising:
   a rotary table rotatably disposed on which a workpiece is placed;
   a rotation angle sensor configured to detect the rotation angle of the rotary table;
   a probe including a stylus ball;
   a moving mechanism configured to cause the probe to move;
   a coordinate value sensor configured to detect the coordinate values of the probe;

a controller configure to control the rotary table and the moving mechanism to cause the stylus ball to touch the workpiece; and an analyzer configured to use detected values that are detected by each of the sensors when the stylus ball is caused to touch the workpiece by the controller and corrected stylus ball diameters that are calculatory diameter values of the stylus ball to analyze the profile of the workpiece, the analyzer comprising:

a storage unit configured to store beforehand calibrated diameter values that is calculated per each height position by performing, with respect to a reference gauge that has an outer reference cylindrical surface and an inner reference cylindrical surface, valuing of diameter values of the outer and inner reference cylindrical surfaces of the reference gauge at a plurality of different height positions from a bottom surface of the reference gauge;

a measured diameter value calculating unit configured to calculate, per each of the height positions, measured diameter values that are diameter values of a regression circle that fits a state of distribution of center points of the stylus ball when the stylus ball has touched each measurement site of the outer and inner reference cylindrical surfaces as a result of the stylus ball being caused to touch a plurality of measurement sites on the outer and inner reference cylindrical surfaces of the reference gauge at each of the height positions in a state where the reference gauge is placed on the rotary table and rotated to thereby determine outer diameters of the reference gauge by point-measurement, outer diameters of the reference gauge by profile-measurement, inner diameters of the reference gauge by point-measurement, and inner diameters of the reference gauge by profile-measurement at each of the height positions;

a corrected stylus ball diameter calculating unit configured to calculate the corrected stylus ball diameters based on the outer diameters of the reference gauge by the point-measurement, the outer diameters of the reference gauge by the profile-measurement, the inner diameters of the reference gauge by the point-measurement, and the inner diameters of the reference gauge by the profile-measurement at each of the height positions; and an analyzing unit configured to use the corrected stylus ball diameters to calculate the profile of the workpiece.

3. The form measuring instrument according to claim 2, wherein:

the analyzing unit further comprises:

an analysis-use corrected stylus ball diameter calculating unit configured to calculate, from the corrected stylus ball diameters that are calculated per each of the height positions, analysis-use corrected stylus ball diameters that are used when analyzing the workpiece; and a workpiece analyzing unit configured to use the analysis-use corrected stylus ball diameters to analyze the profile of the workpiece; and the analysis-use corrected stylus ball diameter calculating unit calculates, from the corrected stylus ball diameters that are calculated per each of the height positions, approximate functions whose variables are height positions that are measured and calculates, from the approximate functions, analysis-use corrected stylus ball diameters corresponding to height positions of the workpiece that the controller measures.

4. The form measuring instrument according to claim 2, wherein:

the analyzing unit further comprises:

an analysis-use corrected stylus ball diameter calculating unit configure to calculate, from the corrected stylus ball diameters that are calculated per each of the height positions, analysis-use corrected stylus ball diameters that are used when analyzing the workpiece; and a workpiece analyzing unit configured to use the analysis-use corrected stylus ball diameters to analyze the profile of the workpiece; and the analysis-use corrected stylus ball diameter calculating unit calculates, as the analysis-use corrected stylus ball diameters, average values of the corrected stylus ball diameters that are calculated per each of the height positions.

5. The corrected stylus ball diameter calculating method according to claim 1, wherein:

the reference gauge is a cylindrical square or a ring gauge.

6. The corrected stylus ball diameter calculating method according to claim 1, wherein:

the reference gauge is a cylindrical square.

7. The corrected stylus ball diameter calculating method according to claim 1, wherein:

the reference gauge is a ring gauge.

8. The form measuring instrument according to claim 2, wherein:

the reference gauge is a cylindrical square or a ring gauge.

9. The form measuring instrument according to claim 2, wherein:

the reference gauge is a cylindrical square.

10. The form measuring instrument according to claim 2, wherein:

the reference gauge is a ring gauge.

* * * * *